US008259532B2

(12) United States Patent
Chang et al.

(10) Patent No.: US 8,259,532 B2
(45) Date of Patent: Sep. 4, 2012

(54) HYBRID MODELING IN THE TAU-P DOMAIN

(75) Inventors: Toshi Thomas Chang, Sugar Land, TX (US); Luis Canales, Houston, TX (US); Alfonso Gonzalez, Sugar Land, TX (US)

(73) Assignee: WesternGeco L.L.C., Houston, TX (US)

( * ) Notice: Subject to any disclaimer, the term of this patent is extended or adjusted under 35 U.S.C. 154(b) by 848 days.

(21) Appl. No.: 12/331,516

(22) Filed: Dec. 10, 2008

(65) Prior Publication Data

US 2010/0142321 A1      Jun. 10, 2010

(51) Int. Cl.
*G01V 1/00* (2006.01)
(52) U.S. Cl. ............................ 367/73; 367/37; 367/38
(58) Field of Classification Search .................. 181/108; 367/21, 31, 37, 38, 43, 50, 51, 52, 53, 62, 367/69, 73, 74, 83; 702/18, 16
See application file for complete search history.

(56) References Cited

U.S. PATENT DOCUMENTS

| | | | | |
|---|---|---|---|---|
| 4,760,563 | A | * | 7/1988 | Beylkin ........................... 367/73 |
| 4,809,235 | A | | 2/1989 | Dragoset, Jr. |
| 4,937,794 | A | * | 6/1990 | Marschall et al. .............. 367/21 |
| 5,583,825 | A | | 12/1996 | Carrazzone et al. |
| 6,018,500 | A | | 1/2000 | Chambers |
| 6,643,590 | B2 | * | 11/2003 | Wiggins ........................ 702/16 |

FOREIGN PATENT DOCUMENTS

GB      2329043  A      3/1999

OTHER PUBLICATIONS

Akbar et al., "Prestack plane-wave Kirchhoff migration in laterally varying media," Geophysics, 61, pp. 1068-1079, 1996.*
PCT Search Report, dated Jul. 26, 2010, Application No. PCT/US2009/067357.
Chang, et al, Forward Modeling Attribute Analysis for AVO and Prestack Depth Migration, SEG Annual Conference, Oct. 2002.
Lecomte, et al, Efficient and Flexible Seismic Modeling of Reservoirs: A Hybrid Approach, The Leading Edge. May 2004, pp. 432-437.
Moczo, et al, Hybrid Modeling of P-SV Seismic Motion at Inhomogeneous Viscoelastic, Bulletin of Seismological Society of America, Oct. 1997, pp. 1305-1327, vol. 87, No. 5.

* cited by examiner

*Primary Examiner* — Jack W Keith
*Assistant Examiner* — Daniel L Murphy

(57) ABSTRACT

A method for generating a synthetic seismogram. In one implementation, the method may include generating a first seismogram in a tau-p domain for a wavefront that moves through an overburden to an upper boundary of a reservoir. The first seismogram is based on a common shot point gather. The method may further include generating a second seismogram in the tau-p domain for the wavefront moving from the upper boundary to a lower boundary of the reservoir and reflected back up to the upper boundary; generating a third seismogram in the tau-p domain for the wavefront moving from the upper boundary of the reservoir through the overburden; and adding the first seismogram in the tau-p domain, the second seismogram in the tau-p domain, and the third seismogram in the tau-p domain.

17 Claims, 10 Drawing Sheets

HYBRID MODELING IN THE TAU-P DOMAIN

BACKGROUND

1. Field of the Invention

Implementations of various technologies described herein generally relate to methods and systems for modeling synthetic seismograms.

2. Description of the Related Art

The following descriptions and examples are not admitted to be prior art by virtue of their inclusion within this section.

Seismic data signals are typically acquired by measuring and recording data during a seismic survey. A seismic survey may be performed by repeatedly firing an impulsive seismic energy source at the surface of the earth, sea or seafloor and recording the received signals at a set of receivers. The receivers may typically be situated at the same surface as the source, but laterally displaced on regular grid positions. However, there may be situations where a non-regular distribution of the receivers is preferred or where the source and the receivers may be positioned at different depth levels. In a typical seismic survey, the source and the receivers may be displaced at fixed intervals (e.g., 25 meters) and in a certain direction (e.g., the "inline" direction).

During the seismic survey, the cycle of firing the source and recording the received signals may be repeated a plurality of times. When firing the seismic source, a pressure wave may be excited and propagated into the subsurface. The pressure wave reflects off interfaces between various earth layers (such as rock, sand, shale, and chalk layers) and propagates upwardly to the set of receivers, where the particle velocity of the wave vibrations or the pressure oscillations of the wave may be measured and recorded.

The strength of the reflected wave is proportional to the amount of change in elastic parameters, e.g., density, pressure velocity, and shear velocity, at the respective interfaces. Consequently, the data recorded by the receivers represents the elastic characteristics of the subsurface below the receivers.

The seismic survey provides a seismogram that can be used to model images of the subsurface. Images of the subsurface may be derived by determining a velocity model of the subsurface. The velocity model is determined within a recursive process that generates synthetic seismograms, and compares the synthetic seismograms to the seismogram from the survey. The velocity model is updated until the synthetic seismogram is similar to the actual survey seismogram.

The synthetic seismogram may be generated as numerous reconstructed wavefronts. The reconstructed wavefronts may be 3-dimensional models of the pressure wave as the pressure wave travels through the subsurface. Typically, the reconstructed wavefronts are modeled using polygon triangulation.

SUMMARY

Described herein are implementations of various technologies for a method for generating a synthetic seismogram. In one implementation, the method may include generating a first seismogram in a tau-p domain for a wavefront that moves through an overburden to an upper boundary of a reservoir. The first seismogram is based on a common shot point gather. The method may further include generating a second seismogram in the tau-p domain for the wavefront moving from the upper boundary to a lower boundary of the reservoir and reflected back up to the upper boundary; generating a third seismogram in the tau-p domain for the wavefront moving from the upper boundary of the reservoir through the overburden; and adding the first seismogram in the tau-p domain, the second seismogram in the tau-p domain, and the third seismogram in the tau-p domain.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

Figure 1:
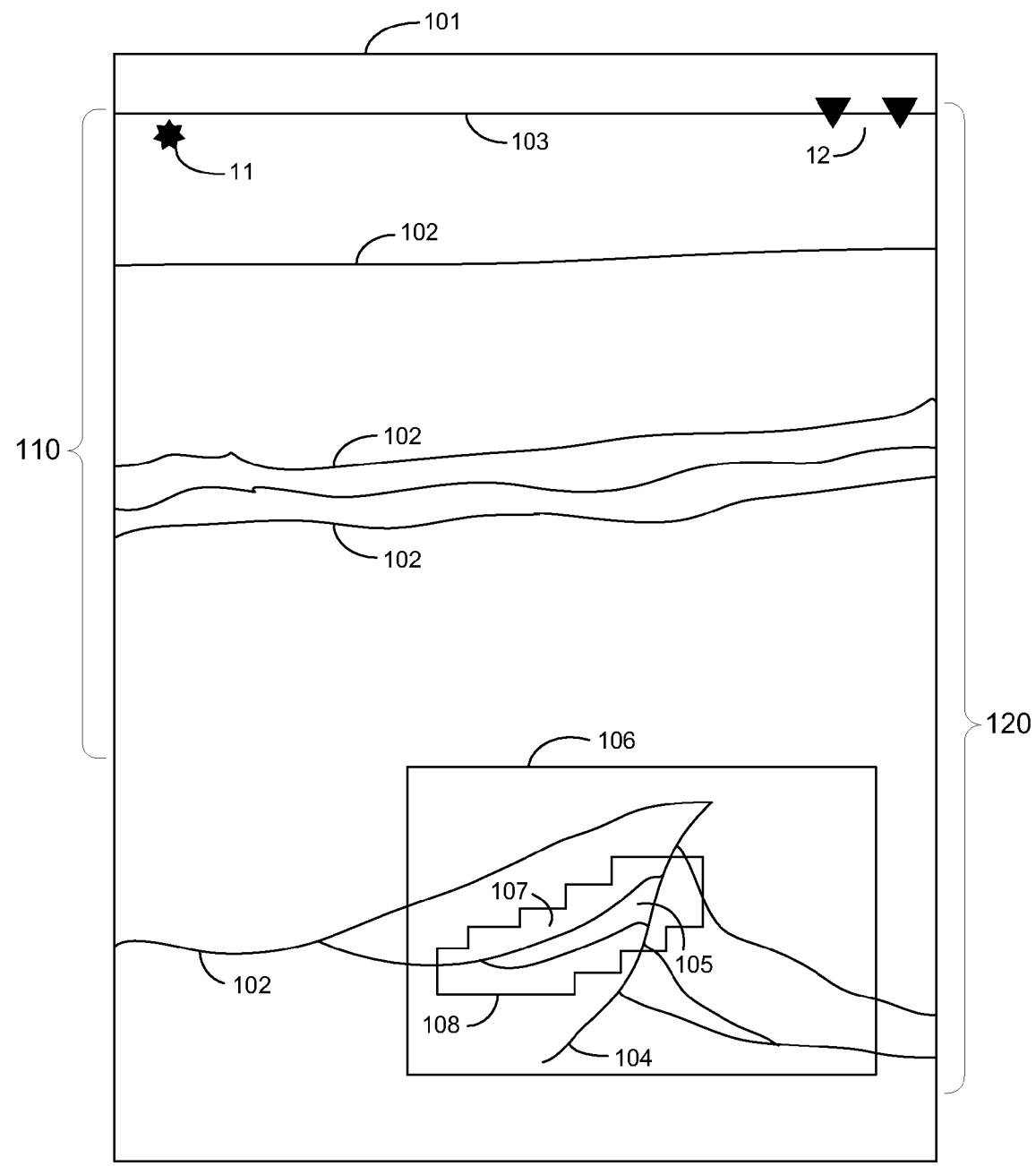
FIG. 1 illustrates a two-dimensional earth model, in accordance with one or more implementations of various techniques described herein.

FIG. 1 illustrates a two-dimensional earth model 10, in accordance with one or more implementations of various techniques described herein. The earth model 10 may represent a velocity model of an actual surface 103 and subsurface 120 surveyed using seismic equipment.

The earth model 10 may be an estimation of the velocities of the subsurface 120 and may be refined in an iterative process that involves the production of synthetic seismograms. Synthetic seismograms may be produced by modeling a seismic wavefront in the earth model 10. By comparing the synthetic seismograms to the actual seismograms produced by the survey, it may be possible to refine the earth model 10 to more accurately reflect the velocities of the subsurface region 120. It should be noted that the terms seismic wavefront and wavefront are used interchangeably herein.

The earth model 10 includes a first boundary 101, several strata 102, and a surface layer 103. The first boundary 101 may be an absorbing, reflecting, or mixed boundary for the purpose of modeling seismic waves in the earth model 10.

At the surface layer 103, the locations of a source 11 and receivers 12 are marked by a solid star and two triangles, respectively. In one implementation, an explosive type 40 Hz Ricker wavelet may be used as the source 11. In another implementation, a recorded wavelet from a seismic experiment may be used as the source 11. For the purpose of simplicity, only two receivers 12 are shown, but more are possible.

Most of the strata 102 form an overburden 110 of comparatively flat layers. The deeper layers, however, are interrupted by an almost vertical fault 104, thus forming a potential trap 105 for hydrocarbons. A second (inner) boundary 106 encloses this potential trap 105 together with a reservoir 107 and an injection boundary 108. The portions of the injection boundary 108 surrounding the reservoir 107 may be referred to herein as an upper and lower reservoir boundary, respectively.

According to implementations described herein, the synthetic seismogram may be generated with a combination of modeling methods. For example, the modeling methods may differ depending on the region of the subsurface 120 that the wavefront is passing through. In one implementation, the seismic wavefront passing through the overburden 110 may be modeled using an adaptive wavefront construction method. The adaptive wavefront construction method is described in greater detail with reference to FIG. 2.

Advantageously, the adaptive wavefront construction method may provide the amplitude, travel time, and phase of the wavefront at the upper reservoir boundary. As such, the wavefront passing through the reservoir 107 may be modeled using finite difference modeling. Because finite difference modeling is computationally expensive, combining different modeling methods may allow for reserving computational resources to modeling regions of the subsurface regions that are of particular interest.

Figure 2:
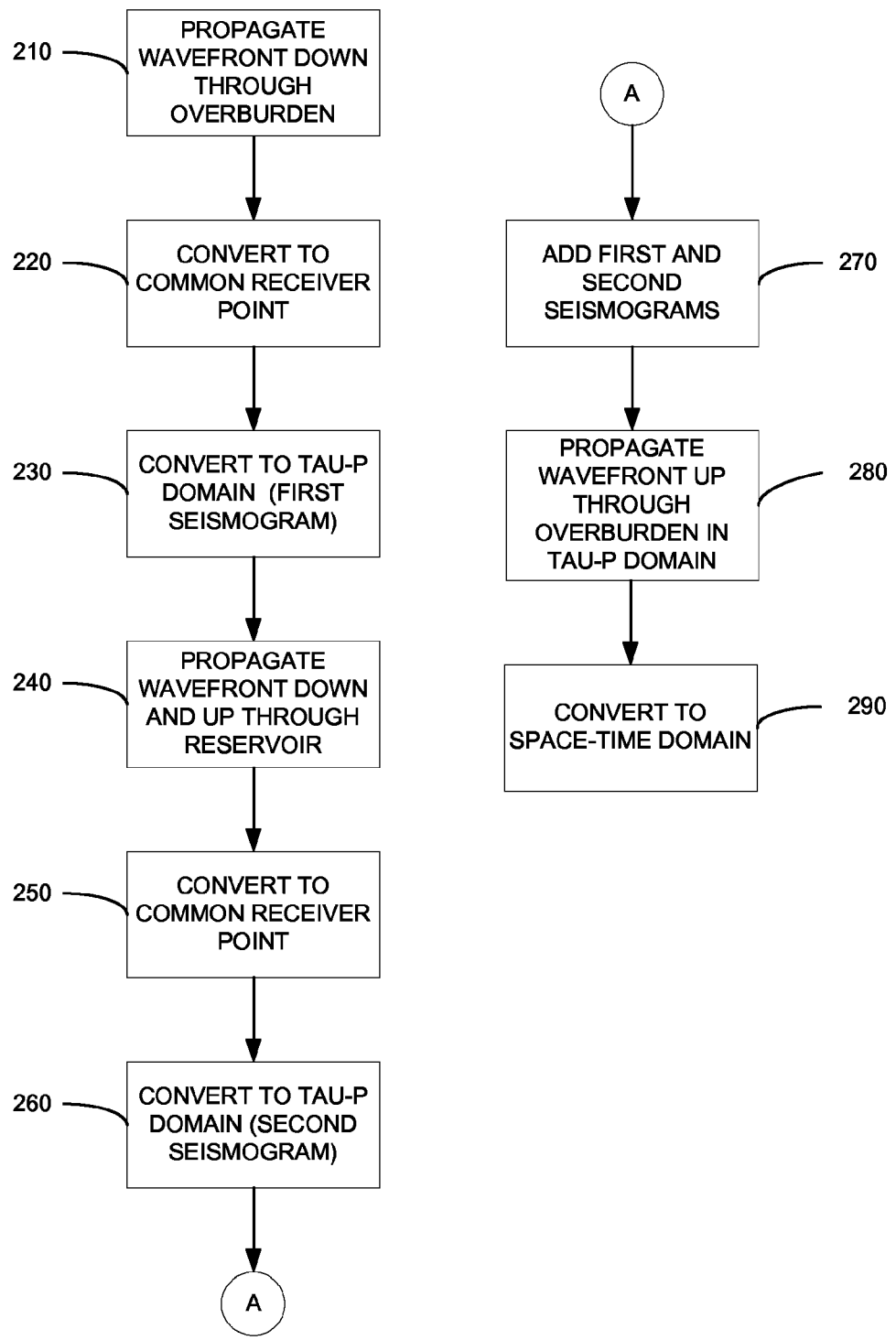
FIG. 2 illustrates a flowchart of a method for hybrid seismic modeling, according to implementations described herein.

FIG. 2 illustrates a flowchart of a method 200 for hybrid modeling in the tau-p domain according to implementations described herein. It should be understood that while the operational flow diagram indicates a particular order of execution of the operations, in some implementations, certain portions of the operations might be executed in a different order.

Figure 3A:
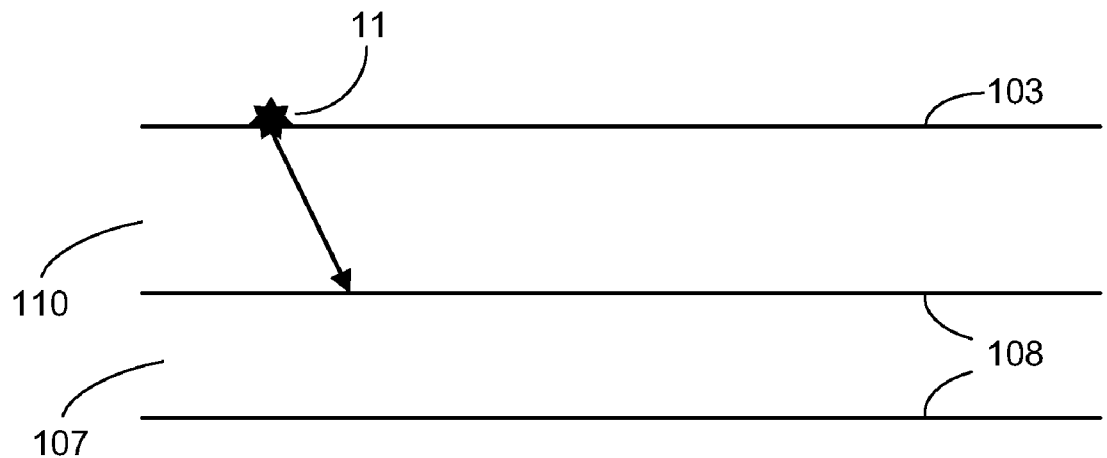
FIGS. 3A-3D illustrate the directional flow of a seismic wave through a two-dimensional earth model, in accordance with one or more implementations of various techniques described herein.

Method 200 generates a synthetic seismogram in three stages for the wavefront passing from the source 11 to receiver 12. Steps 210-230 describe generating a first synthetic seismogram in a tau-p domain for the wavefront passing down through the overburden 110. FIG. 3A illustrates the wavefront passing down through the overburden 110.

Figure 3B:
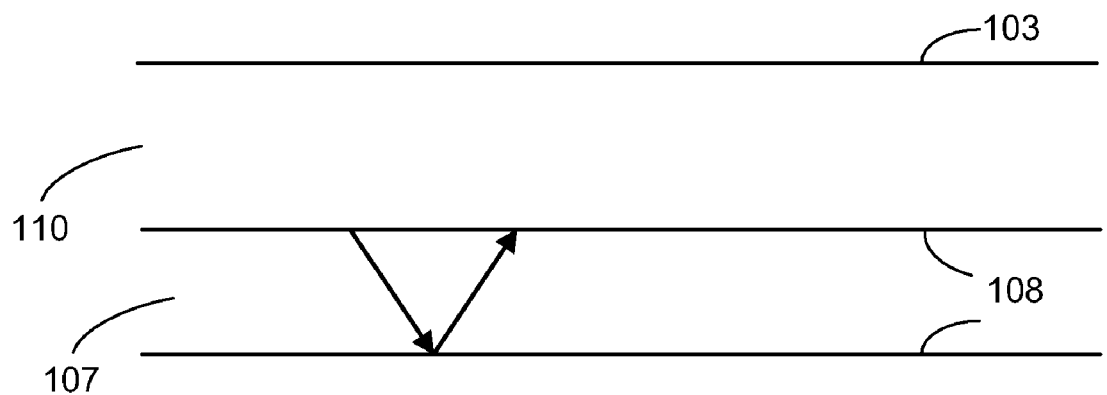

Then, steps 240-260 describe generating a second synthetic seismogram in the tau-p domain for the wavefront passing into and reflected back out of the reservoir. FIG. 3B illustrates the wavefront passing into and reflected back out of the reservoir 107.

Figure 3C:
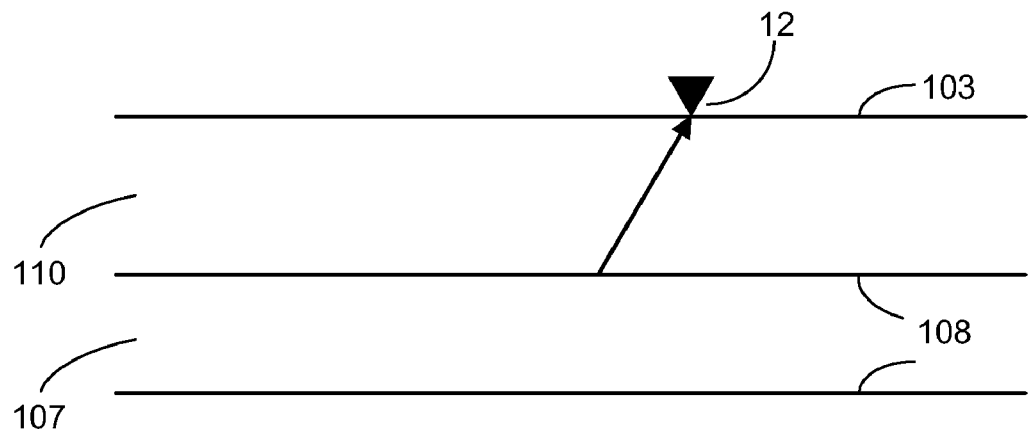
Figure 3D:
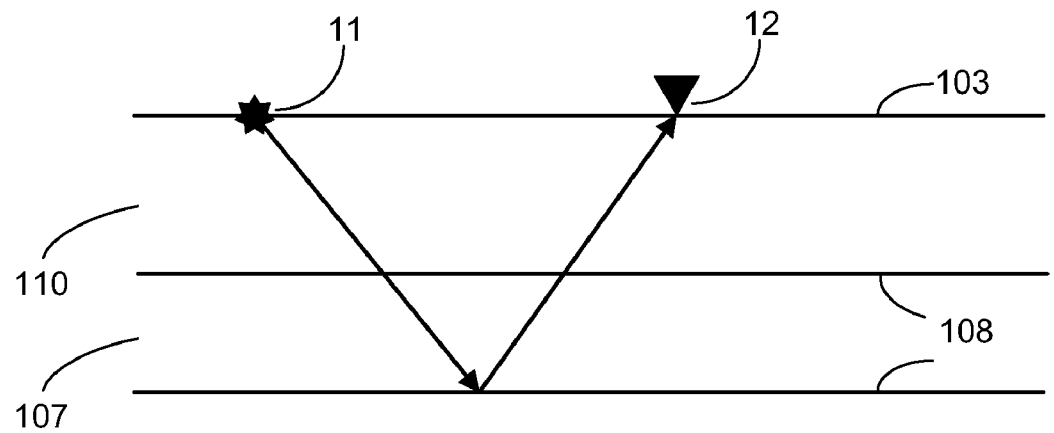

Finally, steps 270-290 describe generating a third synthetic seismogram in the tau-p domain for the wavefront reflected back up through the overburden from the top of the reservoir 107. FIG. 3C illustrates the wavefront reflected back up through the overburden from the top of the reservoir 107. FIG. 3D illustrates the full path of the wavefront passing from the source 11 to the receiver 12.

At step 210, the wavefront may be propagated in the time-space domain down through the overburden 110 to the upper reservoir boundary 108. The wavefront may represent a first synthetic seismogram in the time-space domain for the wavefront passing through the overburden 110 to the upper reservoir boundary 108. In one implementation, the first synthetic seismogram in the time-space domain may be represented with a common shot point gather.

Once propagated to the upper reservoir boundary 108, the boundary conditions of the wavefront may be determined, i.e., the amplitude, phase and travel time of the wavefront.

The wavefront may be propagated down through the overburden 110 by reconstructing the wavefront at successive time intervals. The wavefront may be propagated using a modeling technique that defines amplitude, phase, and travel time for the wavefront at the upper reservoir boundary.

In one implementation of a modeling technique, ray tracing may be performed on the overburden 110. Ray tracing is a method for calculating the path of waves, such as acoustic pulses, through regions of varying propagation velocity, absorption characteristics, and reflecting surfaces. In ray tracing, the wavefront of the acoustic pulses may be represented using a number of rays. The rays may be propagated through the overburden 110 in specified time intervals. At any specified time interval, the endpoint of each ray may extend to a point on the surface of a seismic wavefront.

The endpoints of the rays at a specified time interval may also be referred to herein as control points. Each control point may be characterized by x, y, and z spatial coordinates, traveltime, and amplitude.

The wavefront may be reconstructed by triangulating the control points at the specified time interval. In one implementation, the wavefront may be reconstructed by triangulating the control points using Delaunay triangulation.

In three-dimensional space, a Delaunay triangulation for a set of points is a triangulation such that no point is inside the circumscribed sphere of any other triangle. The circumscribed sphere is a sphere that contains the three points of any triangle in the triangulation. Delaunay triangulations may be used to maximize the minimum angle of all the angles of the triangles in the triangulation, and thus tend to avoid skinny triangles.

The Delaunay condition states that a triangulation is a Delaunay triangulation if all the circumscribed spheres of all the triangles in the triangulation are empty. The circumscribed sphere of a triangle is empty if it does not contain vertices other than the three vertices that define the triangle.

In some scenarios, rays may be completely reflected by formations in the overburden 110. For example, a salt formation may completely reflect 99% of the rays that hit the formation. As such, it may be determined whether there are any rays missing due to complete reflection.

Figure 4A:
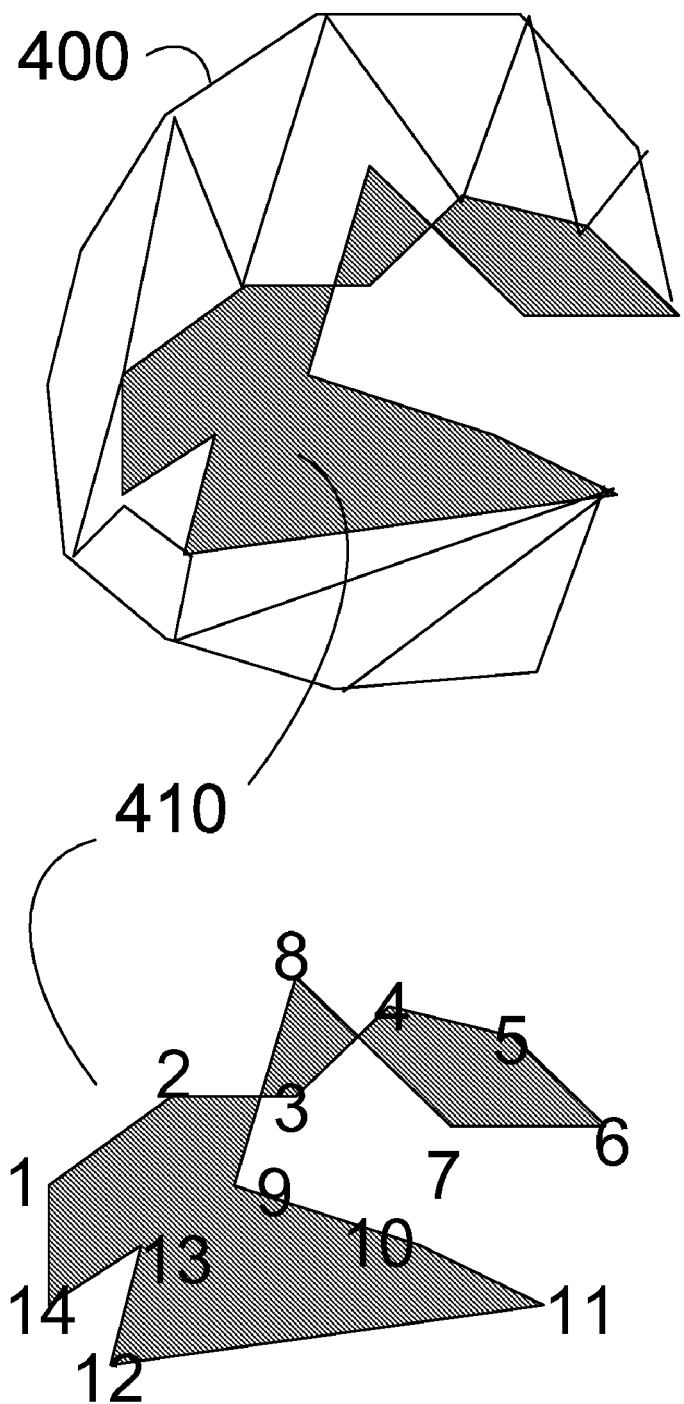
FIG. 4A illustrates a reconstructed wavefront having a hole in accordance with implementations described herein.
Figure 4B:
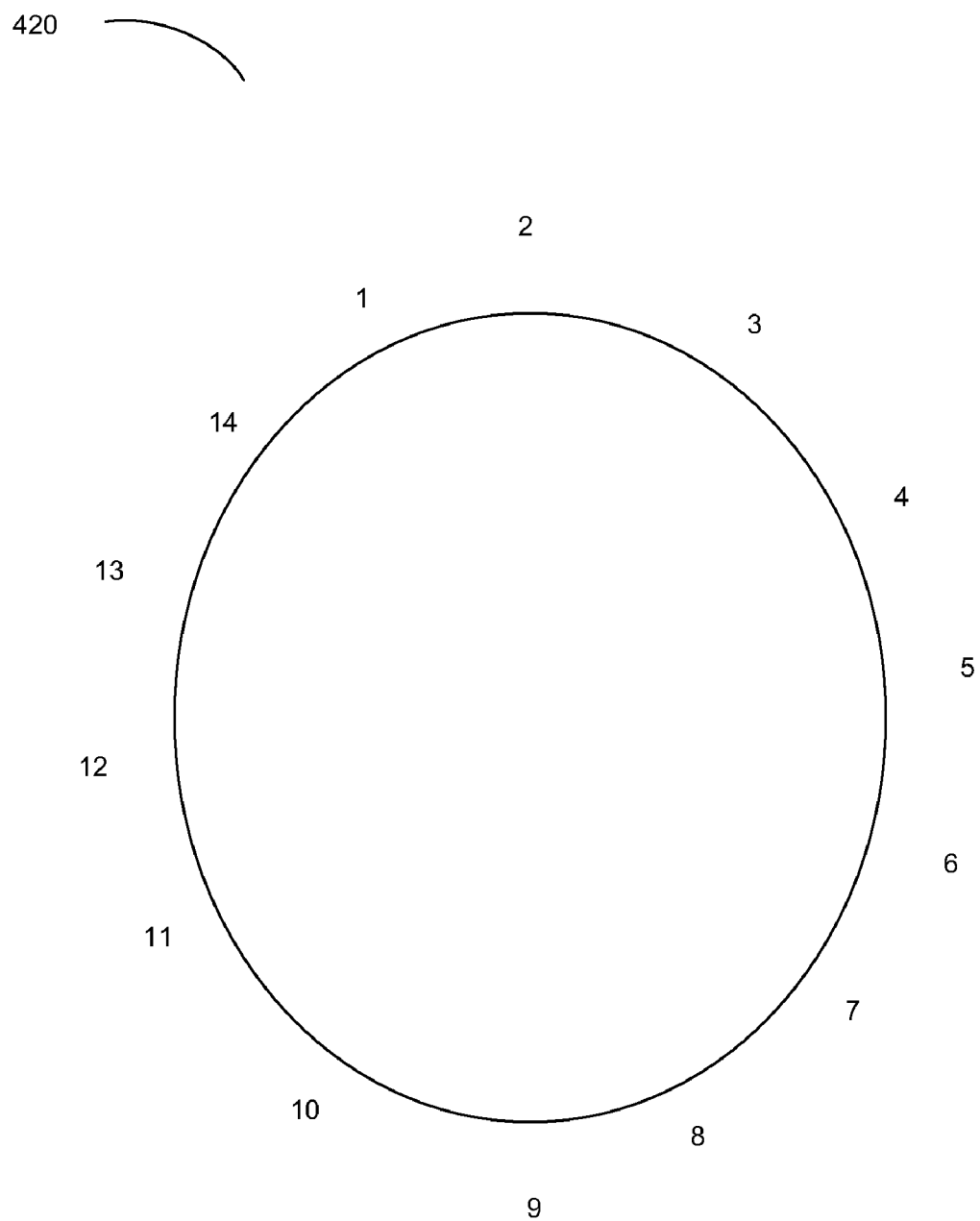
FIG. 4B illustrates a control point circle with points corresponding to a seismic wavefront hole in accordance with implementations described herein.
Figure 4C:
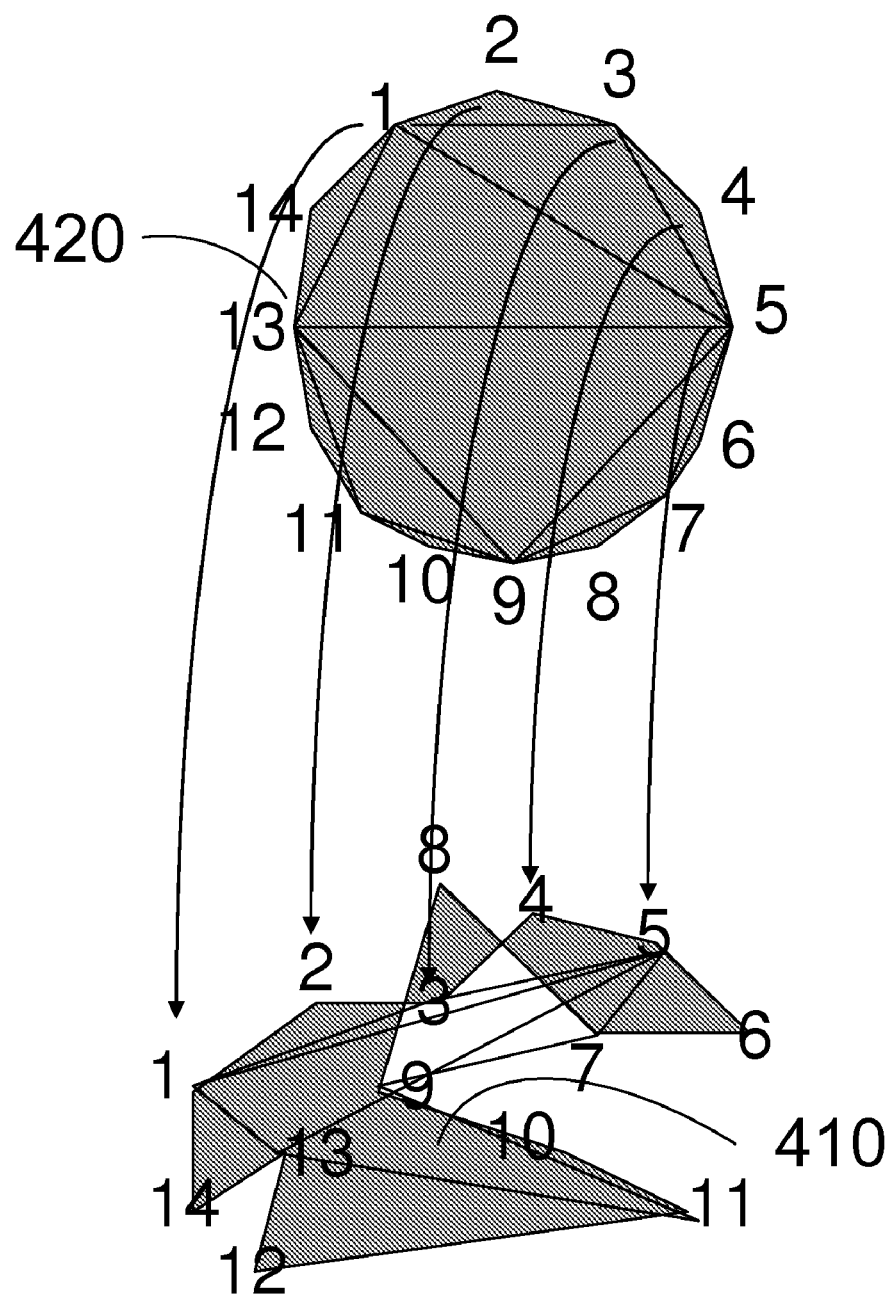
FIG. 4C illustrates a mapping of a Delaunay triangulation from a control point circle to a wavefront hole in accordance with implementations described herein.
Figure 4D:
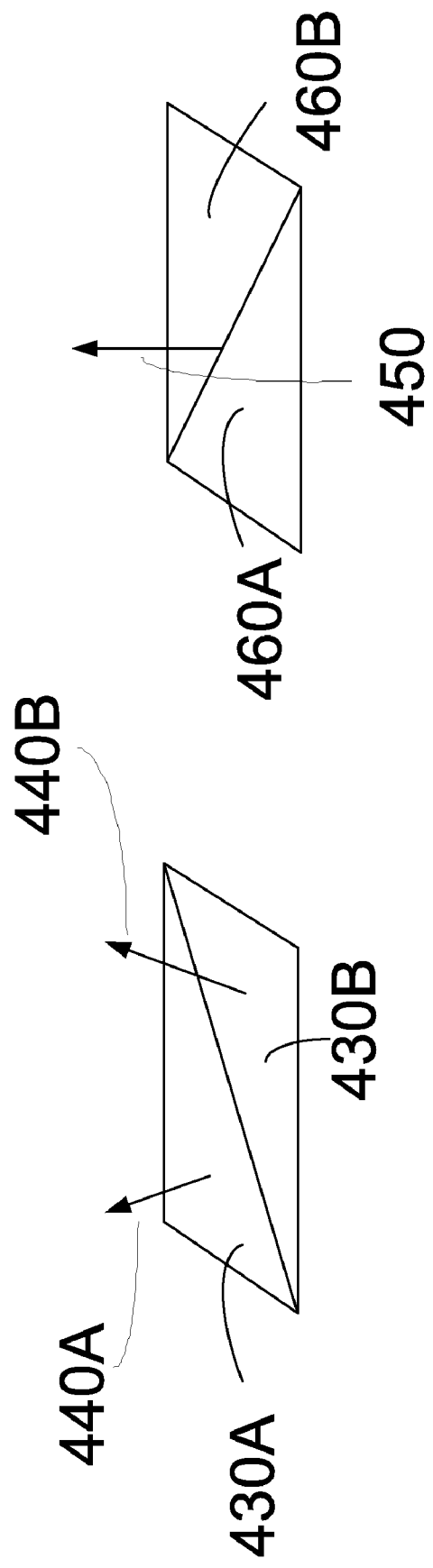
FIG. 4D illustrates a new triangulation of adjacent triangles on the reconstructed wavefront in accordance with implementations described herein.

Missing rays may create holes in the reconstructed seismic wavefront. FIG. 4A illustrates a reconstructed seismic wavefront 400 having a hole 410 associated with one or more missing rays. Holes in the reconstructed seismic wavefront 400 indicate gaps in the synthetic seismograms. Filling the holes in the wavefront 400 as they develop may protect the integrity of the attributes that are propagated with the wavefront, such as amplitude, traveltime and energy. In one implementation, adaptive wavefront construction may be used to fill the holes Adaptive wavefront construction will be described with reference to FIG. 4A, which illustrates the reconstructed wavefront 400 having the hole 410 in accordance with implementations described herein; FIG. 4B, which illustrates a control point circle 420 with points corresponding to a seismic wavefront hole in accordance with implementations described herein; FIG. 4C, which illustrates a mapping of a Delaunay triangulation from a control point circle 420 to the wavefront hole 410 in accordance with implementations described herein; FIG. 4D, which illustrates a triangulation of adjacent triangles on the reconstructed wavefront 400 in accordance with implementations described herein; and FIG. 4E, which illustrates a new triangulation of the reconstructed wavefront 400 in accordance with implementations described herein.

In adaptive wavefront construction, the control points defining the hole 410 in the reconstructed seismic wavefront 400 may be determined. As shown in FIG. 4A, the control points defining the hole 410 are represented by references 1-14.

With reference to FIG. 4B, the control point circle 420 may be generated that has the control points 1-14 defining the hole 410. Herein, the control point circle 420 is also referred to as the circle 420. In one implementation, each of the control points 1-14 may be equidistant along the circumference of the circle 420.

The control points 1-14 may be triangulated, forming a set of triangles on the circle 420. An example of the triangles formed by the triangulation is shown in FIG. 4C. In one implementation, a Delaunay triangulation may be performed on the circle 420 for the control points 1-14.

Typically, the hole 410 that develops in the wavefront 400 may be complex and irregular. Accordingly, the hole 410 may need to be filled with a triangulated surface, i.e., the triangles may span the entire area of the hole.

The triangles formed on the circle 420 may be mapped to the hole 410 in the reconstructed seismic wavefront 400. In other words, each triangle formed by a set of control points on the circle 420 may be mapped to a triangle with the same control points to patch the hole 410.

FIG. 4C illustrates the mapping of the Delaunay triangulation from the control point circle 420 to the wavefront hole 410 in accordance with implementations described herein. For example, a triangle between control points 1, 5, and 13 on the circle 420 may be mapped to a triangle between control points 1, 5, and 13 on the hole 410.

The triangulated surface that fills the hole 410 may not satisfy the Delaunay criteria and may need re-triangulation. Normal vectors may be used on pairs of adjacent triangles to decide which triangulated surfaces to modify. Several iterations might be needed until the Delaunay criteria are satisfied.

Normal vectors for each of the triangles on the hole 410 may be determined. The normal vector for a triangle is a vector that is normal to the surface of the triangle. A new triangulation of the hole 410 may be determined based on the normal vectors of each of the triangles on the hole 410. More specifically, each pair of adjacent triangles on the hole 410 may be determined. Then, for each pair of adjacent triangles on the hole 410, an average vector may be determined based on the normal vectors of the adjacent triangles. The average vector may be the average of the two normal vectors associated with the adjacent triangles. The new triangulation may be based on the average vector.

Figure 4E:
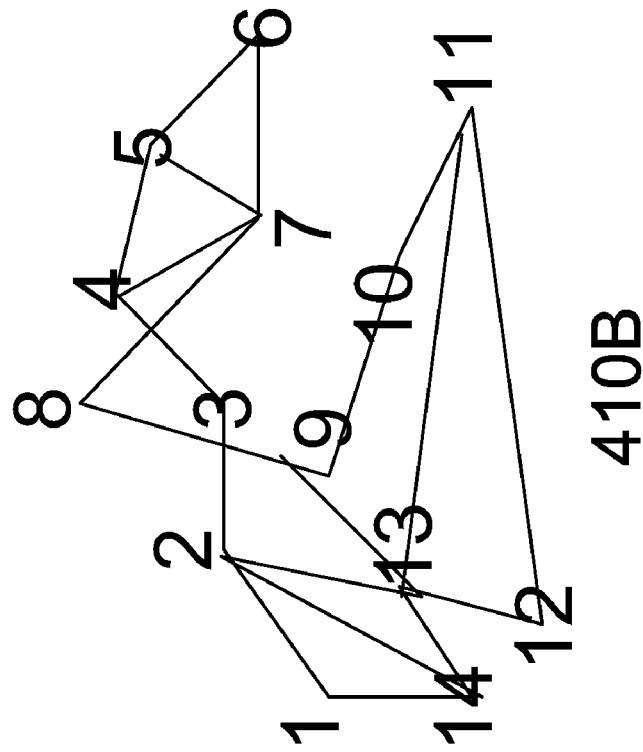
FIG. 4E illustrates a new triangulation of the reconstructed wavefront in accordance with implementations described herein.
Figure 4E:
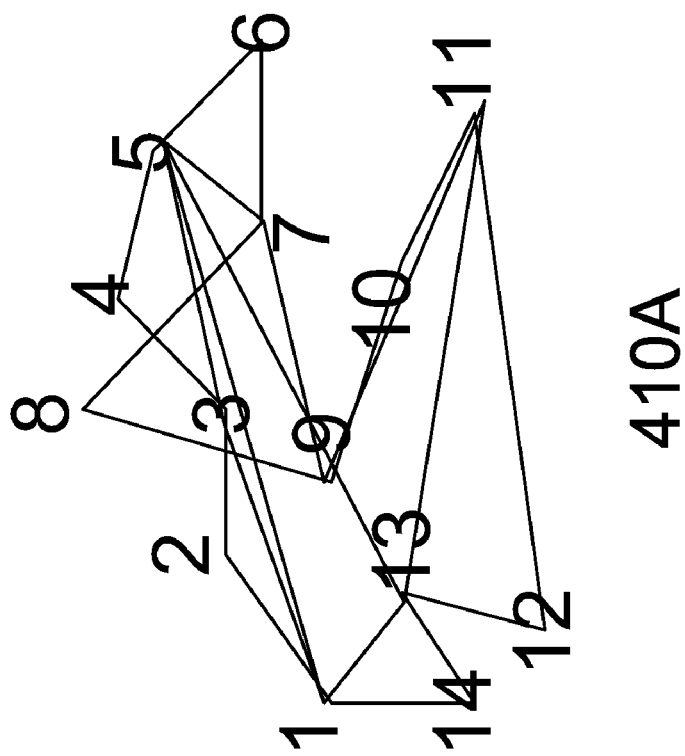

For example, referring to FIG. 4D, two adjacent triangles 430A and 430B are shown along with their respective normal vectors 440A and 440B. A new triangulation may be determined based on the average vector 450. FIG. 4E illustrates the new triangulation (triangles 460A and 460B) based on the average vector 450. Accordingly, triangulation 410A may represent the triangulation mapped from the circle 420, and triangulation 410B may represent the new Delaunay triangulation based on the normal vectors.

The reconstructed seismic wavefront 400 is also referred to herein as the propagated wavefront. Referring back to FIG. 2, at step 220, the propagated wavefront may be converted from the common shot point gather to a common receiver point gather. Converting from common shot point to common receiver point may facilitate a conversion of the wavefront to the tau-p domain.

Accordingly, at step 230, the first synthetic seismogram in the time-space domain may be converted to the tau-p domain. As such, a first synthetic seismogram in the tau-p domain is generated for the wavefront passing from the source to the upper reservoir boundary 108.

At step 240, the propagated wavefront (in the time-space domain, before conversion) may be propagated down into the reservoir 107. The wavefront may be propagated in the time-space domain from the upper reservoir boundary 108 down to the lower reservoir boundary 108, and reflected back to the upper reservoir boundary 108. This propagation may produce a second synthetic seismogram in the time-space domain.

A modeling technique may be used to propagate the wavefront into the reservoir that uses the amplitude of the wavefront at the upper reservoir boundary 108. In one implementation, the modeling technique may be finite difference modeling. Other modeling techniques may be used; however, finite difference modeling may provide a high degree of detail about the velocities of the reservoir 107. After propagating the wavefront back to the upper reservoir boundary 108, the boundary conditions of the propagated wavefront may be determined.

At step 250, the second synthetic seismogram may be converted from the common shot point gather to a common receiver point gather. At step 260, the second synthetic seismogram in the time-space domain may be converted to the tau-p domain. As such, a second synthetic seismogram in the tau-p domain is generated for the wavefront passing down into the reservoir and reflected back to the upper reservoir boundary 108.

At step 270, the first synthetic seismogram in the tau-p domain and the second synthetic seismogram in the tau-p domain may be added together. At step 280, the wavefront may be propagated from the upper reservoir boundary 108 back up through the overburden 110 in the tau-p domain. The wavefront may be propagated back up through the overburden using a modeling technique that defines an amplitude of the wavefront at the top of the overburden 110. In one implementation, the wavefront modeling technique may be an adaptive wavefront construction method, as described above.

At step 290, the full synthetic seismogram from the source 11 down to the lower reservoir boundary 108, and back to the receiver 12 may be converted to the time-space domain. The conversion may generate a full synthetic seismogram in the time-space domain from the source 11 down to the lower reservoir boundary 108, and back to the receiver 12 in the time-space domain.

Figure 5:
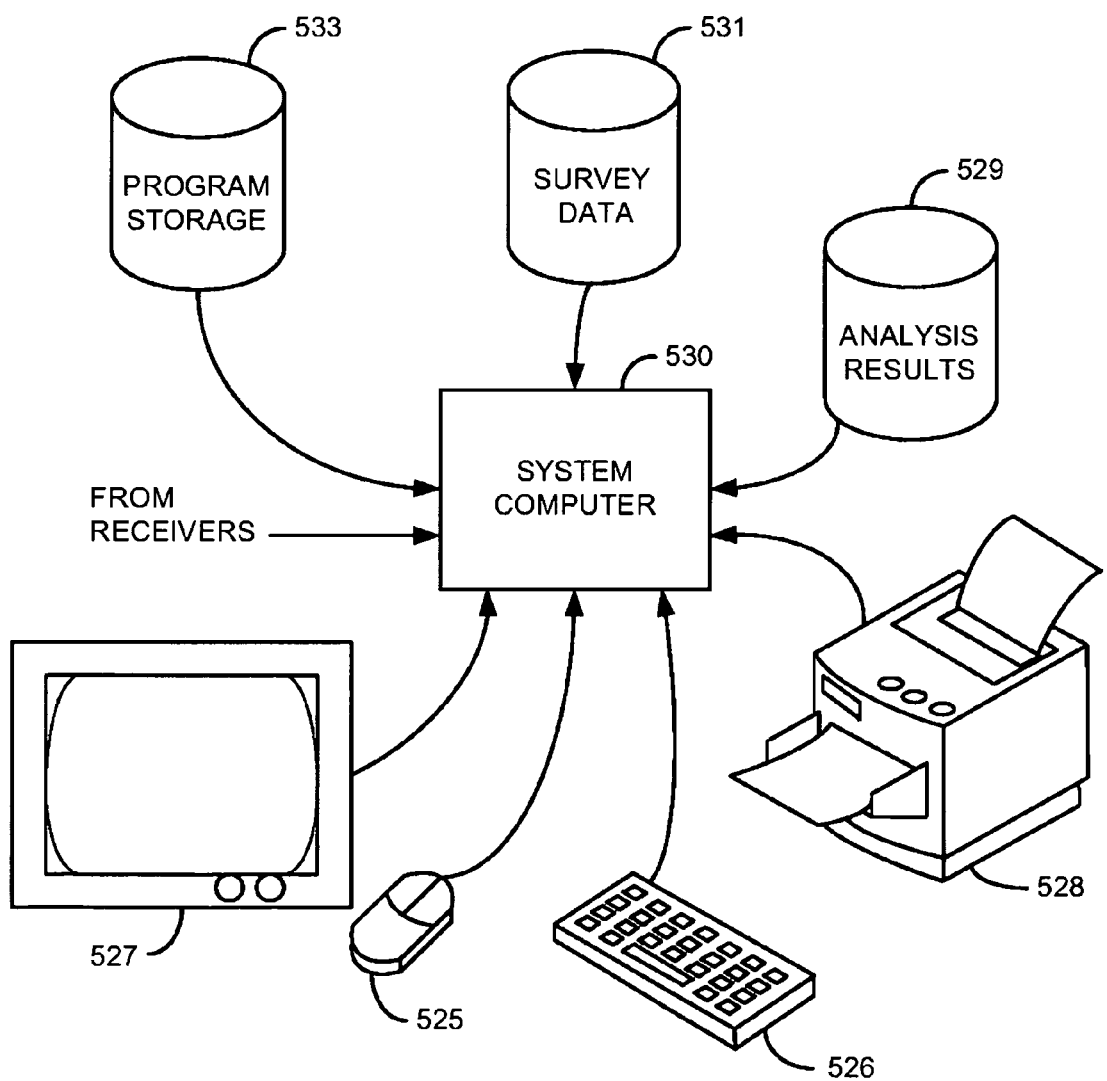
FIG. 5 illustrates a computer network, into which implementations of various technologies described herein may be implemented.

FIG. 5 illustrates a computing system 500, into which implementations of various technologies described herein may be implemented. The computing system 500 may include one or more system computers 530, which may be implemented as any conventional personal computer or server. However, those skilled in the art will appreciate that implementations of various technologies described herein may be practiced in other computer system configurations, including hypertext transfer protocol (HTTP) servers, handheld devices, multiprocessor systems, microprocessor-based or programmable consumer electronics, network PCs, mini-computers, mainframe computers, and the like.

The system computer 530 may be in communication with disk storage devices 529, 531, and 533, which may be external hard disk storage devices. It is contemplated that disk storage devices 529, 531, and 533 are conventional hard disk drives, and as such, will be implemented by way of a local area network or by remote access. Of course, while disk storage devices 529, 531, and 533 are illustrated as separate devices, a single disk storage device may be used to store any and all of the program instructions, measurement data, and results as desired.

In one implementation, seismic data from the receivers may be stored in disk storage device 531. The system computer 530 may retrieve the appropriate data from the disk storage device 531 to process seismic data according to program instructions that correspond to implementations of various technologies described herein. The program instructions may be written in a computer programming language, such as C++, Java and the like. The program instructions may be stored in a computer-readable medium, such as program disk storage device 533. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 530. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 530 may present output primarily onto graphics display 527, or alternatively via printer 528. The system computer 530 may store the results of the methods described above on disk storage 529, for later use and further analysis. The keyboard 526 and the pointing device (e.g., a mouse, trackball, or the like) 525 may be provided with the system computer 530 to enable interactive operation.

The system computer 530 may be located at a data center remote from the survey region. The system computer 530 may be in communication with the receivers (either directly or via a recording unit, not shown), to receive signals indicative of the reflected seismic energy. These signals, after conventional formatting and other initial processing, may be stored by the system computer 530 as digital data in the disk storage 531 for subsequent retrieval and processing in the manner described above. While FIG. 5 illustrates the disk storage 531 as directly connected to the system computer 530, it is also contemplated that the disk storage device 531 may be accessible through a local area network or by remote access.

Furthermore, while disk storage devices 529, 531 are illustrated as separate devices for storing input seismic data and analysis results, the disk storage devices 529, 531 may be implemented within a single disk drive (either together with or separately from program disk storage device 533), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating a synthetic seismogram, comprising:
propagating a wavefront, using a microprocessor, from a seismic source through an overburden to an upper boundary of a reservoir using an adaptive wavefront construction modeling technique, thereby generating a first seismogram that corresponds to the wavefront;
propagating the wavefront using the first seismogram and a finite difference modeling technique, wherein the wavefront is propagated from the upper boundary to a lower boundary of the reservoir and reflected back up to the upper boundary to generate a second seismogram that corresponds to the wavefront propagated using the first seismogram and the finite difference modeling technique; and
using the second seismogram to propagate the wavefront from the upper boundary of the reservoir through the overburden to one or more seismic receiver locations, thereby generating a third seismogram that corresponds to the wavefront propagated using the second seismogram.

2. The method of claim 1, further comprising:
converting the second seismogram from a time-space domain to a tau-p domain.

3. The method of claim 2, wherein the third seismogram is generated in the tau-p domain.

4. The method of claim 3, further comprising converting the third seismogram from the tau-p domain to the time-space domain.

5. The method of claim 1, wherein the first seismogram is based on a common shot point gather and further comprising converting the common shot point gather to a common receiver point gather.

6. The method of claim 1, wherein the first seismogram is generated in a time-space domain.

7. The method of claim 1, wherein the adaptive wavefront construction modeling technique provides an amplitude, travel time and phase of the wavefront at the upper boundary.

8. The method of claim 1, wherein the second seismogram is generated in a time-space domain.

9. The method of claim 1, wherein the finite difference modeling technique uses the amplitude of the wavefront at the upper boundary.

10. The method of claim 1, wherein the third seismogram is generated using the adaptive wavefront construction modeling technique.

11. A non-transitory computer-readable medium having stored thereon computer-executable instructions which, when executed by a computer, cause the computer to:
propagate a wavefront from a seismic source through an overburden to an upper boundary of a reservoir using an adaptive wavefront construction modeling technique, thereby generating a first seismogram that corresponds to the wavefront;
propagate the wavefront using the first seismogram and a finite difference modeling technique, wherein the wavefront is propagated from the upper boundary to a lower boundary of the reservoir and reflected back up to the upper boundary to generate a second seismogram that corresponds to the wavefront propagated using the first seismogram and the finite difference modeling technique; and
use the second seismogram to propagate the wavefront from the upper boundary of the reservoir through the overburden to one or more seismic receiver locations, thereby generating a third seismogram that corresponds to the wavefront propagated using the second seismogram.

12. The non-transitory computer-readable medium of claim 11, wherein the adaptive wavefront construction modeling technique provides an amplitude, travel time and phase of the wavefront at the upper boundary.

13. The non-transitory computer-readable medium of claim 11, further comprising computer-executable instructions which, when executed by a computer, convert the second seismogram from a time-space domain to a tau-p domain.

14. The non-transitory computer-readable medium of claim 13, further comprising computer-executable instructions which, when executed by a computer, convert the third seismogram from the tau-p domain to the time-space domain.

15. The non-transitory computer-readable medium of claim 13, wherein the third seismogram is generated in the tau-p domain.

16. A computer system, comprising:
a processor; and
a memory comprising program instructions executable by the processor to:
propagate a wavefront from a seismic source through an overburden to an upper boundary of a reservoir using an adaptive wavefront construction modeling technique, thereby generating a first seismogram that corresponds to the wavefront;
propagate the wavefront using the first seismogram and a finite difference modeling technique, wherein the wavefront is propagated from the upper boundary to a lower boundary of the reservoir and reflected back up to the upper boundary to generate a second seismogram that corresponds to the wavefront propagated using the first seismogram and the finite difference modeling technique; and
use the second seismogram to propagate the wavefront from the upper boundary of the reservoir through the overburden to one or more seismic receiver locations, thereby generating a third seismogram that corresponds to the wavefront propagated using the second seismogram.

17. The computer system of claim 16, wherein the adaptive wavefront construction modeling technique provides an amplitude, travel time and phase of the wavefront at the upper boundary.

* * * * *